(12) United States Patent
Yamanashi (10) Patent No.: US 9,443,131 B2
(45) Date of Patent: Sep. 13, 2016

(54) WRINKLE DETECTION APPARATUS AND WRINKLE DETECTION METHOD

(71) Applicant: Panasonic Intellectual Property Management Co., Ltd., Osaka (JP)

(72) Inventor: Tomofumi Yamanashi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/715,309

(22) Filed: May 18, 2015

(65) Prior Publication Data

US 2015/0356344 A1 Dec. 10, 2015

(30) Foreign Application Priority Data

Jun. 9, 2014 (JP) ................................ 2014-118503

(51) Int. Cl.
*G06K 9/00* (2006.01)
*G06T 5/10* (2006.01)
*G06K 9/62* (2006.01)

(52) U.S. Cl.
CPC .............. *G06K 9/00221* (2013.01); *G06K 9/00* (2013.01); *G06K 9/6202* (2013.01); *G06T 5/10* (2013.01)

(58) Field of Classification Search
CPC .......... G06T 2207/30088; G06T 2207/30201; G06T 11/00; G06T 7/0028; G06T 2207/30216; G06T 5/008; G06T 7/0012; G06K 9/00362; G06K 9/00221; G06K 9/6202; G06K 9/00234; G06K 9/00268; A61B 5/444; A61B 2018/00452; A61B 5/411; A61B 5/442; A61B 5/445; B41F 17/18; F05D 2220/326; F05D 2220/327; A45D 44/22; A61N 2007/0034; G06F 19/321; A61K 49/006; A61Q 19/08; H04N 19/593; H04N 19/82

USPC ....... 382/103, 112, 118, 128, 135, 162, 173, 382/232
See application file for complete search history.

(56) References Cited

U.S. PATENT DOCUMENTS 5,933,527 A * 8/1999 Ishikawa ............ G06K 9/00268
382/118
6,741,727 B1 * 5/2004 Hirasawa ................. G07D 7/12
356/71

(Continued)

FOREIGN PATENT DOCUMENTS

| EP | 2759981 | 7/2014 |
|---|---|---|
| JP | 2011-008643 | 1/2011 |

(Continued)

OTHER PUBLICATIONS

The Extended European Search Report dated Feb. 12, 2016 for the related European Patent Application No. 15166540.3.

(Continued)

*Primary Examiner* — Vu Le
*Assistant Examiner* — Aklilu Woldemariam
(74) *Attorney, Agent, or Firm* — Greenblum & Bernstein, P.L.C.

(57) ABSTRACT

A wrinkle detection apparatus is an apparatus for detecting a wrinkle area of skin included in an image. The wrinkle detection apparatus includes: an image obtaining unit that obtains the image including the skin; an area estimation unit that estimates a plurality of image areas, each of the plurality of image areas having a different gloss level of the skin; a parameter determination unit that determines one or more parameter values for each of the plurality of estimated image areas, the one or more parameter values being used to detect the wrinkle area; and a wrinkle detection processing unit that detects the wrinkle area in the image by using the determined one or more parameter values for each of the plurality of image areas.

4 Claims, 6 Drawing Sheets

(56) References Cited

U.S. PATENT DOCUMENTS

| | | | |
|---|---|---|---|
| 2002/0015514 A1* | 2/2002 | Kinjo | G06K 9/00221 382/118 |
| 2002/0182149 A1* | 12/2002 | Telesca | A61B 5/441 424/9.1 |
| 2003/0005781 A1* | 1/2003 | Oba | A61B 5/0053 73/862.381 |
| 2005/0241652 A1* | 11/2005 | Hanin | A61K 8/02 128/898 |
| 2006/0034524 A1* | 2/2006 | Kitamura | H04N 19/593 382/232 |
| 2009/0028380 A1* | 1/2009 | Hillebrand | G06T 7/0028 382/100 |
| 2010/0157084 A1* | 6/2010 | Shimamura | G06K 9/00228 348/222.1 |
| 2010/0271470 A1* | 10/2010 | Stephan | A61B 5/0077 348/77 |
| 2011/0002506 A1* | 1/2011 | Ciuc | G06K 9/00234 382/103 |
| 2011/0116691 A1* | 5/2011 | Chung | A61B 5/442 382/128 |
| 2012/0045233 A1* | 2/2012 | Hibi | G03G 15/1615 399/49 |
| 2012/0133753 A1* | 5/2012 | Chang | G06K 9/00221 348/77 |
| 2014/0003734 A1* | 1/2014 | Umansky | G06T 5/003 382/275 |
| 2014/0205159 A1 | 7/2014 | Yoshida | |
| 2015/0351682 A1* | 12/2015 | Yamanashi | G06T 7/0085 600/476 |

FOREIGN PATENT DOCUMENTS

| | | |
|---|---|---|
| JP | 2011-115460 | 6/2011 |
| JP | 2013-069122 | 4/2013 |

OTHER PUBLICATIONS

Chuan-Yu Chang et al: "Automatic Facial Skin Defect Detection System", Broadband, Wireless Computing, Communication and Applications (BWCCA), 2010 International Conference on, IEEE, Piscataway, NJ, USA, Nov. 4, 2010, pp. 527-532.

* cited by examiner

| AREA 311 | TARGET 312 | GABOR FILTER ANGLE 313 | GABOR FILTER WAVELENGTH 314 | THRESHOLD 315 |
|---|---|---|---|---|
| AREAS BELOW BOTH EYES | LARGE WRINKLE | NARROW ANGLE RANGE | SHORT | LOW |
| OVERALL AREA | LARGE WRINKLE | WIDE ANGLE RANGE | LONG | HIGH |

WRINKLE DETECTION APPARATUS AND WRINKLE DETECTION METHOD

BACKGROUND

1. Technical Field

The present disclosure relates to a wrinkle detection apparatus and a wrinkle detection method for detecting a wrinkle area of skin included in an image.

2. Description of the Related Art

Conventionally, a wrinkle area of skin is detected from a photographed face image. The wrinkle area refers to a linear image area of a wrinkle portion shown on the image.

However, an influence of gloss caused by light incident on a skin surface (hereinafter referred to as just "gloss") may inhibit detection of a thin wrinkle or a shallow wrinkle. Therefore, PTL 1, for example, describes a technique for improving accuracy of detection (hereinafter referred to as "wrinkle detection") of the wrinkle area from the image.

The technique (hereinafter referred to as "conventional technique") described in PTL 1 estimates a direction (hereinafter referred to as "a wrinkle direction") in which a wrinkle is likely to extend for each face region included in an image. The conventional technique then performs edge extraction in the estimated wrinkle direction for each face region, and performs wrinkle detection.

CITATION LIST

Patent Literatures

PTL 1: Unexamined Japanese Patent Publication No. 2013-69122
PTL 2: Unexamined Japanese Patent Publication No. 2011-8643
PTL 3: Unexamined Japanese Patent Publication No. 2011-115460

SUMMARY

However, particularly in skin with asperities such as a face, a gloss level may differ significantly between skin portions. Accordingly, even if a state of the wrinkle including the wrinkle direction is identical, a state of the wrinkle area shown on the image may differ significantly between skin portions. Therefore, the conventional technique may cause significant variations in accuracy of wrinkle detection depending on the skin portions.

One non-limiting and exemplary aspect of the present disclosure provides a wrinkle detection apparatus capable of performing wrinkle detection with more uniform accuracy even when the gloss level shows variations.

Additional benefits and advantages of one aspect of the present disclosure will be apparent from the present specification and the drawings. The benefits and/or advantages may be individually provided by various aspects and features disclosed in the present specification and the drawings, which need not all be provided in order to obtain one or more of such benefits and/or advantages.

A wrinkle detection apparatus according to the present disclosure includes: an image obtaining unit that obtains an image including skin; an area estimation unit that estimates a plurality of image areas, each of the plurality of image areas having a different gloss level of the skin; a parameter determination unit that determines one or more parameter values for each of the plurality of estimated image areas, the one or more parameter values being used to detect a wrinkle area; and a wrinkle detection processing unit that detects the wrinkle area in the image by using the determined one or more parameter values for each of the plurality of image areas.

These comprehensive or specific aspects may be implemented by a system, a method, an integrated circuit, a computer program, or a computer-readable recording medium, and may be implemented by an arbitrary combination of a system, a method, an integrated circuit, a computer program, and a computer-readable recording medium. Examples of the computer-readable recording medium include a nonvolatile recording medium, such as a CD-ROM (Compact Disc-Read Only Memory).

The present disclosure enables wrinkle detection with more uniform accuracy even when the gloss level shows variations.

DETAILED DESCRIPTION OF THE PREFERRED EMBODIMENTS

Exemplary embodiments of the present disclosure will be described in detail below with reference to the drawings.

First Exemplary Embodiment

A first exemplary embodiment of the present disclosure is an example of basic aspects of the present disclosure.
<Configuration of a Wrinkle Detection Apparatus>

First, a configuration of a wrinkle detection apparatus according to the present exemplary embodiment will be described.

Figure 1:
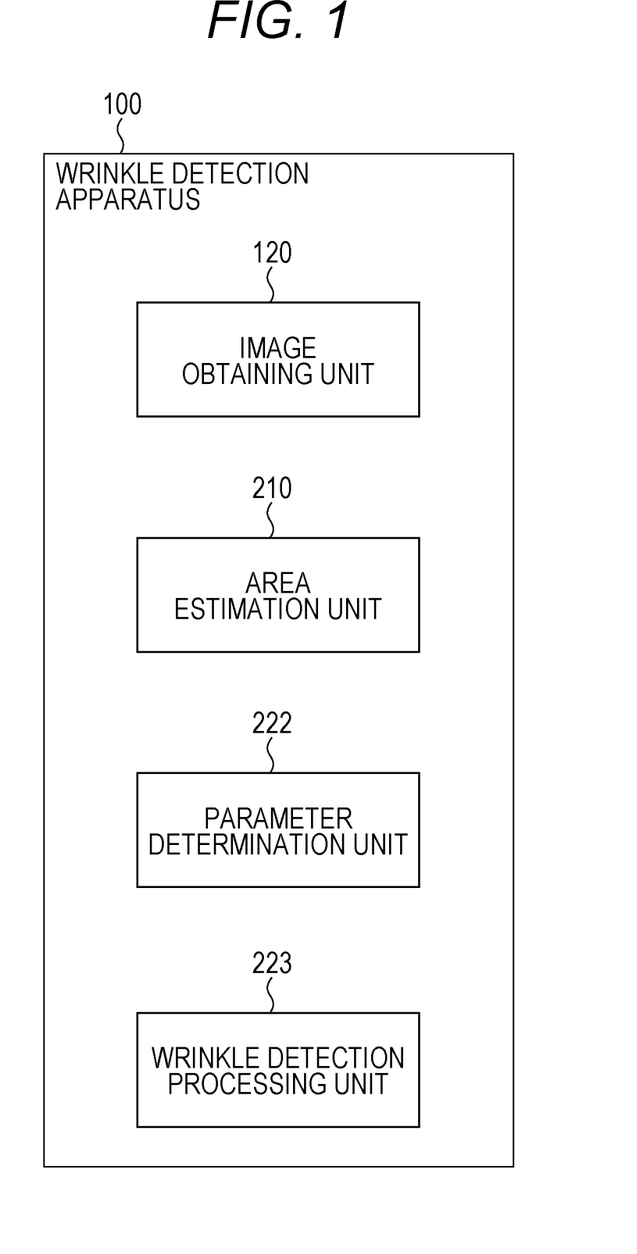
FIG. 1 is a block diagram illustrating an example of a configuration of a wrinkle detection apparatus according to a first exemplary embodiment of the present disclosure.

FIG. 1 is a block diagram illustrating an example of the configuration of the wrinkle detection apparatus according to the present exemplary embodiment.

In FIG. 1, wrinkle detection apparatus 100 is an apparatus for detecting a wrinkle area of skin included in an image, and includes image obtaining unit 120, area estimation unit 210, parameter determination unit 222, and wrinkle detection processing unit 223.

Image obtaining unit 120 obtains the image.

Area estimation unit 210 estimates a plurality of image areas that is positions of the areas in the image, each of the plurality of image areas having a different gloss level of skin.

Parameter determination unit 222 determines one or more parameter values for each of the plurality of estimated image areas, the one or more parameter values being used to detect the wrinkle area.

Wrinkle detection processing unit 223 detects the wrinkle area from the image by using the one or more parameter values determined for each of the image areas.

Wrinkle detection apparatus 100 includes, for example, a CPU (Central Processing Unit), a storage medium, such as a ROM (Read Only Memory) that stores a control program, and a working memory, such as a RAM (Random Access Memory), although not illustrated. In this case, functions of the above units of wrinkle detection apparatus 100 are implemented by the CPU executing the control program.

When there exists a plurality of areas having different gloss levels of skin, wrinkle detection apparatus 100 can use the one or more parameter values properly depending on each corresponding image area to perform wrinkle detection. Therefore, wrinkle detection apparatus 100 can perform wrinkle detection with more uniform accuracy even when the gloss level shows variations.

Second Exemplary Embodiment

A second exemplary embodiment of the present disclosure is an example of a specific aspect in a case where the present disclosure is applied to an apparatus that detects a wrinkle area of facial skin and presents the wrinkle area to a user.

Figure 2:
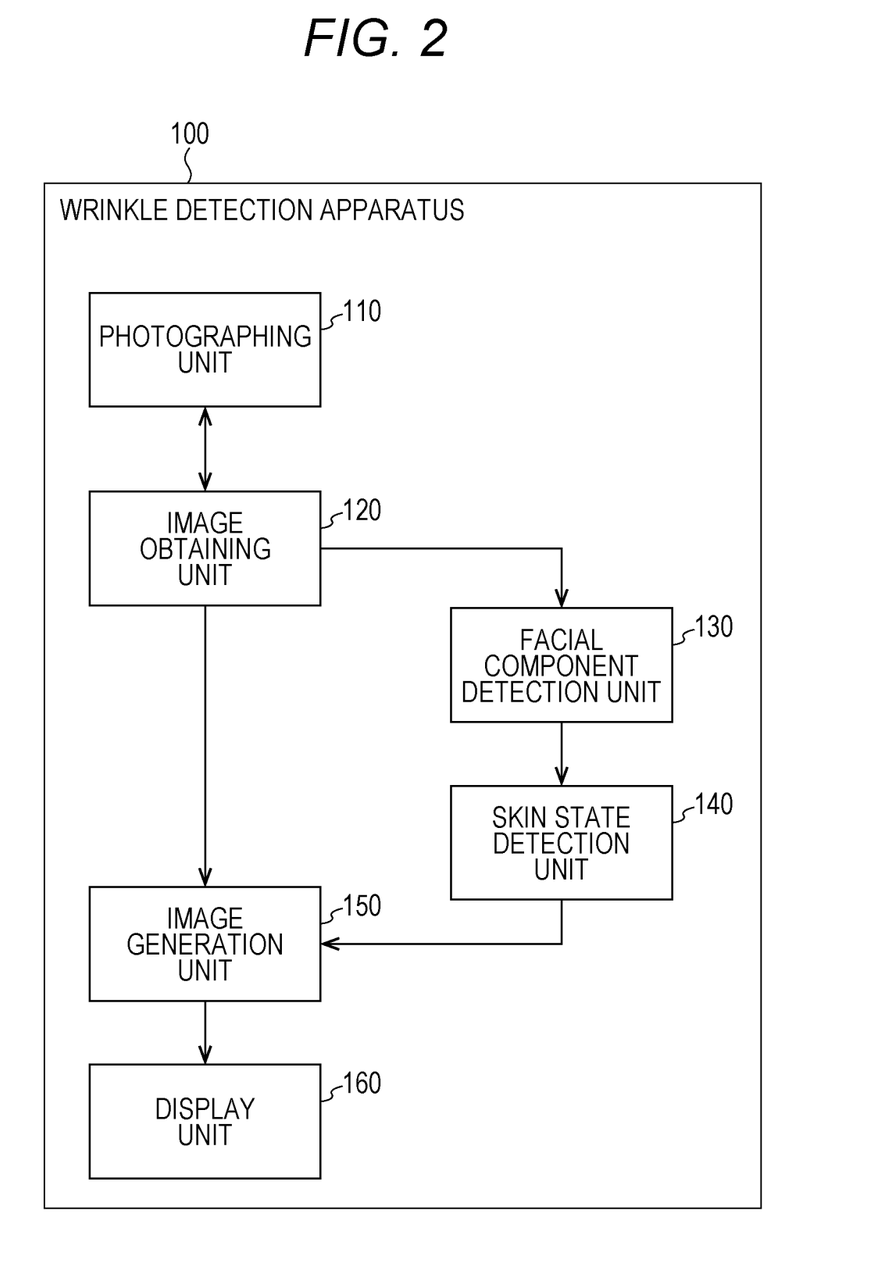
FIG. 2 is a block diagram illustrating an example of a configuration of a wrinkle detection apparatus according to a second exemplary embodiment of the present disclosure.

FIG. 2 is a block diagram illustrating an example of a configuration of wrinkle detection apparatus 100 according to the present exemplary embodiment.

In FIG. 2, wrinkle detection apparatus 100 includes photographing unit 110, image obtaining unit 120, facial component detection unit 130, skin state detection unit 140, image generation unit 150, and display unit 160.

Photographing unit 110 is, for example, a camera including a lens and a color image pickup device, and photographs an image of a user's face. Photographing unit 110 then outputs the photographed image to image obtaining unit 120. An operation of photographing unit 110 is controlled by, for example, image obtaining unit 120.

Image obtaining unit 120 performs required image quality processing, such as brightness adjustment, on the image that is input from photographing unit 110, and outputs the image to each of facial component detection unit 130 and image generation unit 150. As such image quality processing, processing suitable for edge detection processing described later is employed. In the following description, the image that is output from image obtaining unit 120 is referred to as "a photographed image."

The photographed image may be flipped horizontally by image obtaining unit 120 or another unit.

Facial component detection unit 130 detects, from the photographed image, positions of facial components in the photographed image. Each of the facial components refers to a section that constitutes a face, such as eyes, a nose, and cheeks, and can be defined, for example, by a position of a feature of the face, such as inner canthi. Facial component detection unit 130 detects the positions of the facial components by extracting the feature of the face from the photographed image, for example, by using a known image feature detection method such as pattern matching. Facial component detection unit 130 then outputs the photographed image and facial component positional information that indicates the detected positions of the respective facial components to skin state detection unit 140.

Skin state detection unit 140 detects the wrinkle area in the photographed image. Skin state detection unit 140 then outputs wrinkle area information that indicates the detected wrinkle area to image generation unit 150.

Figure 3:
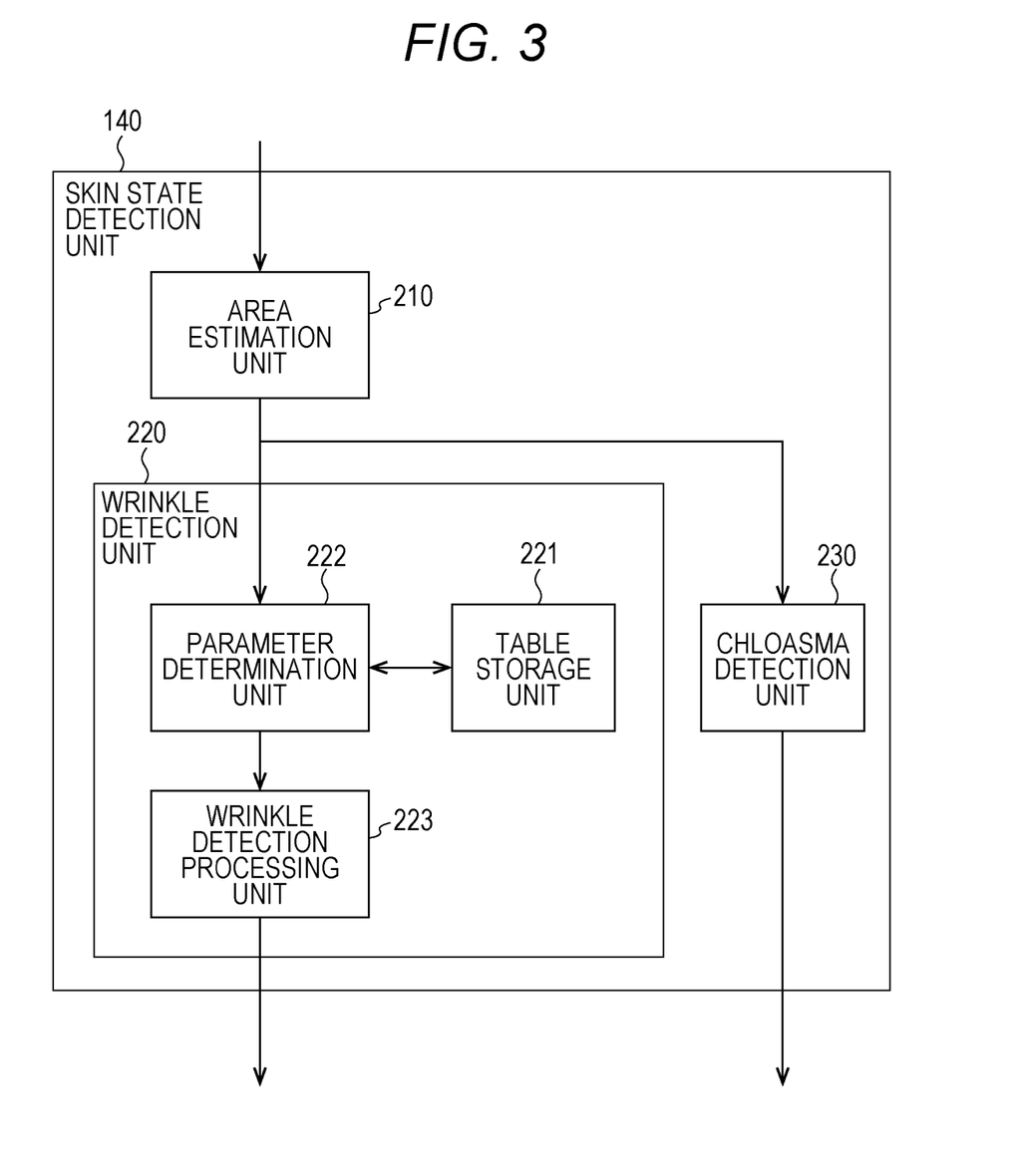
FIG. 3 is a block diagram illustrating an example of a configuration of a skin state detection unit according to the second exemplary embodiment of the present disclosure.

FIG. 3 is a block diagram illustrating an example of a configuration of skin state detection unit 140.

In FIG. 3, skin state detection unit 140 includes area estimation unit 210, wrinkle detection unit 220, and chloasma detection unit 230.

Area estimation unit 210 estimates image areas that are positions of the plurality of areas in the image, each of the areas having a different gloss level of skin, based on the facial component positional information that is input from facial component detection unit 130. Area estimation unit 210 then outputs the photographed image and area positional information that indicates the estimated respective image areas to wrinkle detection unit 220 and chloasma detection unit 230.

In the present exemplary embodiment, the plurality of areas, each of the areas having a different gloss level of skin, refer to an area of from a lower eyelid of a left eye to above a left cheek and an area of from a lower eyelid of a right eye to above a right cheek (hereinafter referred to as "areas below both eyes"), and facial areas other than these areas (hereinafter referred to as "an overall area"). In the following description, the image areas corresponding to the areas below both eyes are referred to as "image areas below both eyes." The image area corresponding to the overall area is referred to as "an overall image area." The overall area does not necessarily need to be an entire face, and may be, for example, an area portion that is a target of detection of a wrinkle, such as cheeks or a forehead.

A light source that illuminates the facial skin is typically located above the face. Accordingly, the areas below both eyes, which are slightly depressed with respect to eyelids or cheeks, are usually likely to be shaded compared with other facial areas, such as cheeks or a forehead. Accordingly, the areas below both eyes are areas where the gloss is relatively low, whereas areas where at least a wrinkle is to be detected, such as cheeks or a forehead, is an area where the gloss is relatively high among the overall area.

Therefore, estimation of the image areas below both eyes and the overall image area is synonymous with estimation of the positions of the plurality of areas in the photographed image, each of the areas having a different gloss level of skin.

For example, area estimation unit 210 previously stores an area table that defines a positional relationship between the plurality of features of the face and each of the areas below both eyes and the overall area. Area estimation unit 210 estimates the image areas below both eyes and the overall image area with reference to such an area table.

Area estimation unit 210 may exclude an area occupied by eyelashes, hair, a rim of glasses, and the like from the image area. For example, the eyelashes area can be removed through use of a known image processing technique, such as techniques described in PTL 2 or PTL 3.

Wrinkle detection unit 220 detects the wrinkle area from the photographed image. Wrinkle detection unit 220 includes table storage unit 221, parameter determination unit 222, and wrinkle detection processing unit 223.

Table storage unit 221 previously stores a parameter value table. The parameter value table is a table that describes the correspondence relation between each of the plurality of above-mentioned areas (the areas below both eyes and the overall area in the present exemplary embodiment) and the one or more parameter values used for detection of the wrinkle area described later.

In the present exemplary embodiment, it is assumed that the wrinkle area is detected through calculation of a gradient value of each portion of the photographed image, using a Gabor filter, and through comparison of the gradient value with a threshold. The gradient value refers to a value that indicates a degree of change in a pixel value in the photographed image, and becomes higher in an edge portion where the degree of change is larger.

Figure 4:
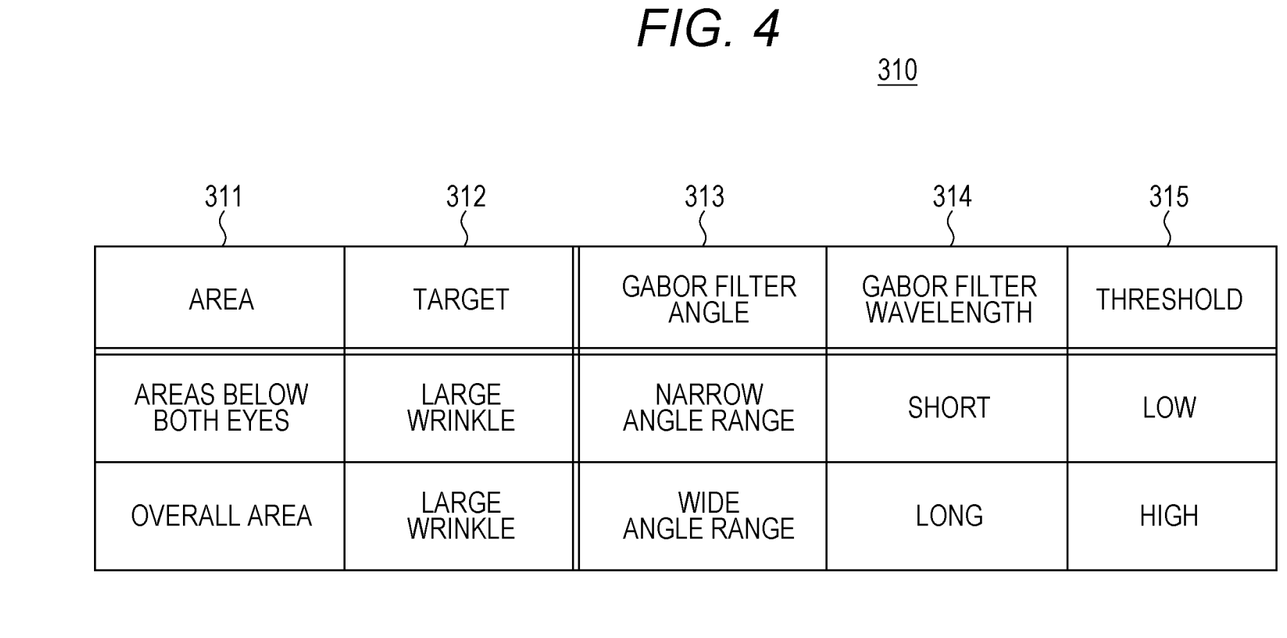
FIG. 4 is a diagram illustrating an example of contents of a parameter value table according to the second exemplary embodiment of the present disclosure.

FIG. 4 is a diagram illustrating an example of contents of the parameter value table.

As illustrated in FIG. 4, in association with area 311, parameter value table 310 describes detection target 312, Gabor filter angle 313, Gabor filter wavelength 314, and gradient threshold 315.

A Gabor function g is expressed by Mathematical Formula (1), for example. In Mathematical Formula (1), λ represents a cosine component of the wavelength, θ represents a direction of a striped pattern, ψ represents a phase offset, and γ represents a spatial aspect ratio. In Mathematical Formula (1), the Gabor filter wavelength is a value of λ, and the Gabor filter angle is a value of θ.

[Mathematical Formula (1)]

$$g(x, y; \lambda, \theta, \psi, \sigma, \gamma) = \exp\left(\frac{-x'^2 + \gamma^2 y'^2}{2\sigma^2}\right)\cos\left(2\pi\frac{x'}{\lambda} + \psi\right) \quad (1)$$

where
$x' = x\cos\theta + y\sin\theta,$
$y' = -x\sin\theta + y\cos\theta$

For example, the gloss is relatively low in the areas below both eyes, as described above. Therefore, it is unlikely that elements other than the wrinkle, such as a chloasma, will be detected (hereinafter referred to as "misdetection"). Because of low brightness, however, it is likely that the wrinkle will be shown thinner on the image than the actual wrinkle, and that the wrinkle that actually exists will not be detected (hereinafter referred to as "omission of detection"). In addition, there are many large wrinkles in the areas below both eyes compared with in the overall area.

Accordingly, the large wrinkles are set as detection target 312 in the areas below both eyes. In order to reduce possibility of omission of detection, the areas below both eyes are associated with wavelength 314 shorter than the wavelength that is set in the overall area, and with threshold 315 lower than the threshold that is set in the overall area.

Most of the wrinkles in the areas below both eyes extend in a direction obliquely outward and downward from the inner canthi. Accordingly, the areas below both eyes are associated with Gabor filter angle 313 limited to such a direction, that is, an angle narrower than the angle that is set in the overall area.

As described above, the gloss is relatively high in the overall area. Accordingly, while omission of detection is unlikely to occur, misdetection is likely to occur. In addition, there are many fine wrinkles in the overall area compared with in the areas below both eyes.

Therefore, although the large wrinkles are set as detection target 312 in the overall area in a similar manner to the areas below both eyes, in order to reduce possibility of misdetection of the fine wrinkles into the large wrinkles, the overall area is associated with wavelength 314 longer than the wavelength that is set in the areas below both eyes, and with threshold 315 higher than the threshold that is set in the areas below both eyes.

The direction of the wrinkle in the overall area includes almost all the directions. Accordingly, the overall area is associated with Gabor filter angle 313 wider than the angle that is set in the areas below both eyes Therefore, for the image areas below both eyes, parameter determination unit 222 determines "the limited angle" as the Gabor filter angle, "the short wavelength" as the Gabor filter wavelength, and "the low threshold" as the gradient threshold.

Parameter value table 310 may describe one or more parameter values for three or more types of areas, each of the three or more types of areas having a different gloss level of skin. In this case, area estimation unit 210 estimates the image area that is the position in the photographed image for each of the three or more types of such areas.

With reference to parameter value table 310 (see FIG. 4), parameter determination unit 222 of FIG. 3 determines the one or more parameter values used for wrinkle area detection for each of the image areas indicated by the area positional information that is input from area estimation unit 210. In the present exemplary embodiment, parameter determination unit 222 determines the Gabor filter angle, the Gabor filter wavelength, and the gradient threshold for each of the image areas below both eyes and the overall image area. Parameter determination unit 222 then outputs the photographed image, the area positional information, and parameter information that indicates the parameter values determined for each area, to wrinkle detection processing unit 223.

Based on the area positional information and parameter information that are input from parameter determination unit 222, wrinkle detection processing unit 223 detects the wrinkle area from the photographed image that is input from parameter determination unit 222, through use of the one or more parameter values determined for each area. In the present exemplary embodiment, wrinkle detection processing unit 223 calculates the gradient value for each portion of the photographed image through use of the Gabor filter processing. Wrinkle detection processing unit 223 then detects the wrinkle area from the photographed image through comparison of the calculated gradient value with a threshold. That is, wrinkle detection processing unit 223 performs known edge detection processing. When the gradient value becomes higher as the degree of change in the pixel value becomes higher, an area where the gradient value is equal to or greater than a threshold is detected as the wrinkle area. Wrinkle detection processing unit 223 then outputs the wrinkle area information that indicates the detected wrinkle area to image generation unit 150 (see FIG. 2).

From the photographed image that is input from area estimation unit 210, chloasma detection unit 230 detects a chloasma area of skin included in the photographed image. For example, chloasma detection unit 230 performs processing for extracting the pixel having the pixel value equal to or less than a threshold, for at least a detection area indicated by detection area information that is input, among the photographed image, by using signals of RGB channels, thereby performing such chloasma area detection. Chloasma detection unit 230 then outputs chloasma area information that indicates the detected chloasma area to image generation unit 150.

Based on the wrinkle area information that is input from wrinkle detection processing unit 223, image generation unit 150 of FIG. 2 generates a wrinkle image that indicates the wrinkle area in the photographed image, and generates a wrinkle-enhanced image obtained by superimposing the generated wrinkle image on the photographed image. The wrinkle image is, for example, an image for indicating a position of a wrinkle line with the wrinkle area filled with a predetermined color. Image generation unit 150 then outputs the generated wrinkle-enhanced image to display unit 160.

The wrinkle-enhanced image may be flipped horizontally by image generation unit 150 or downstream display unit 160. Image generation unit 150 may generate a chloasma image that indicates the chloasma area in the photographed image based on the chloasma area information, and may include the generated wrinkle image in the wrinkle-enhanced image.

Display unit 160 includes, for example, a liquid crystal display, and displays the wrinkle-enhanced image that is input from image generation unit 150.

Wrinkle detection apparatus 100 includes, for example, a CPU, a storage medium such as a ROM that stores a control program, and a working memory such as a RAM, although not illustrated. In this case, functions of the above units of wrinkle detection apparatus 100 are implemented by the CPU executing the control program.

Wrinkle detection apparatus 100 having such a configuration can determine the parameter values that reduce omission of detection for the image areas corresponding to the areas below both eyes having a low gloss of skin. Wrinkle detection apparatus 100 can determine the parameter values that reduce misdetection for the image areas corresponding to other areas having a high gloss of skin. Wrinkle detection apparatus 100 can perform wrinkle detection by using the parameter values determined for each of the plurality of areas, and can present the detection result to a user.

<Operation of the Wrinkle Detection Apparatus>

Next, an operation of wrinkle detection apparatus 100 will be described.

Figure 5:
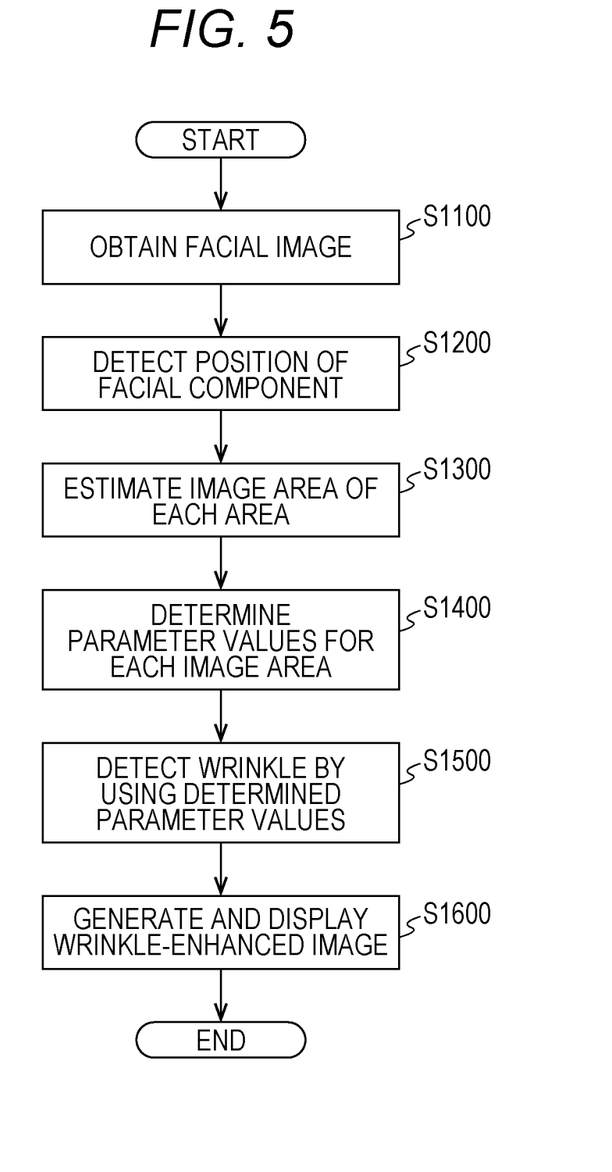
FIG. 5 is a flow chart illustrating an example of an operation of the wrinkle detection apparatus according to the second exemplary embodiment of the present disclosure.

FIG. 5 is a flow chart illustrating an example of the operation of wrinkle detection apparatus 100.

In step S1100, image obtaining unit 120 obtains the photographed image of the user's face by using photographing unit 110.

In step S1200, facial component detection unit 130 detects the position of each facial component from the photographed image.

In step S1300, with reference to the above-mentioned area table, area estimation unit 210 estimates the plurality of image areas (positions in the photographed image), each of the image areas having a different gloss level of skin, based on the position of each facial component. In the present exemplary embodiment, such the plurality of areas is the areas below both eyes and the overall area.

In step S1400, with reference to parameter value table 310 (see FIG. 4), parameter determination unit 222 determines the one or more parameter values for each of the plurality of estimated image areas (the image areas below both eyes and the overall image area).

In step S1500, wrinkle detection processing unit 223 detects the wrinkle area by using the one or more parameter values determined for each area, and through the Gabor filter processing and comparison between the gradient value and the threshold. Chloasma detection unit 230 detects the chloasma area.

In step S1600, image generation unit 150 generates the wrinkle-enhanced image, and displays the generated wrinkle-enhanced image by using display unit 160.

Figure 6:
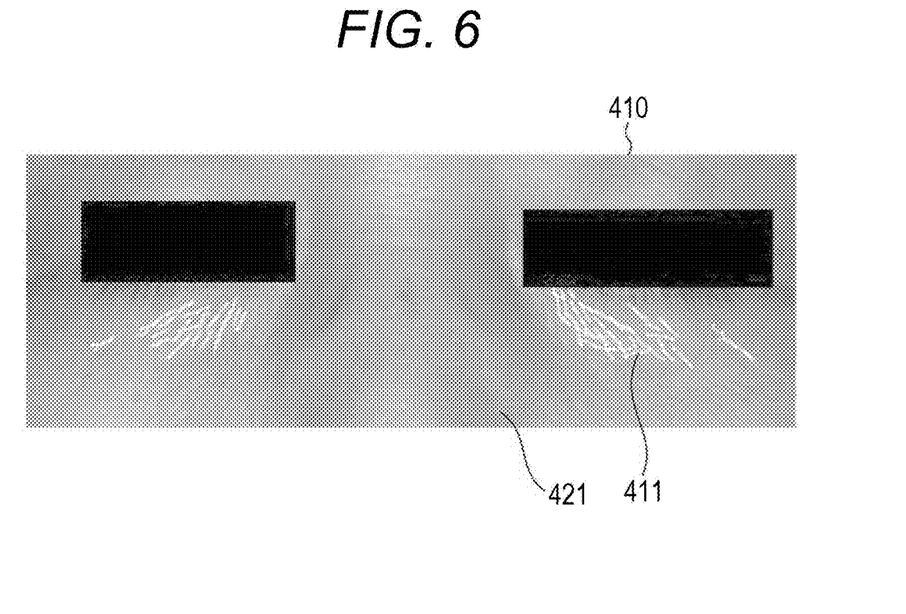
FIG. 6 is a diagram illustrating an example of a wrinkle-enhanced image according to the second exemplary embodiment of the present disclosure.
Figure 7:
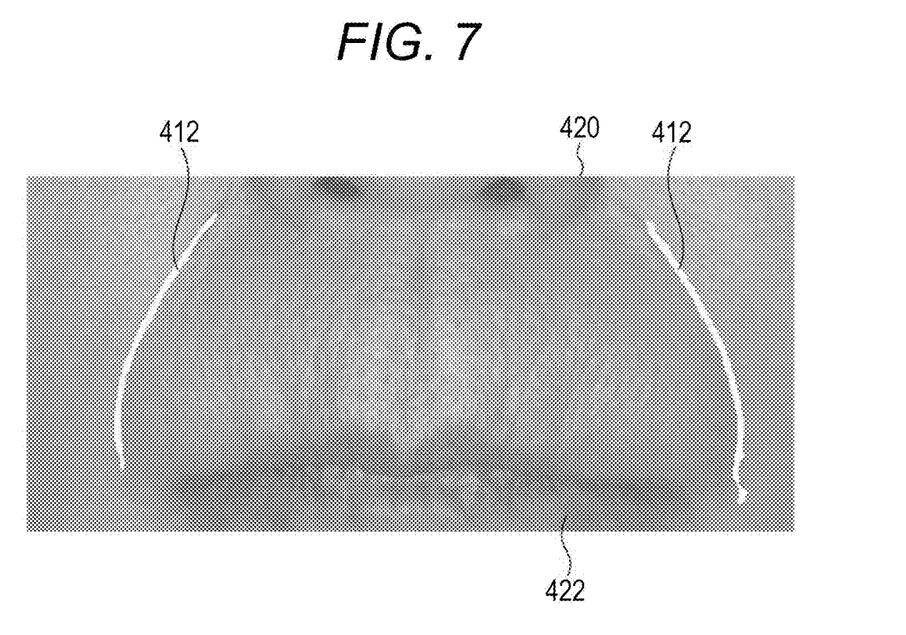
FIG. 7 is a diagram illustrating another example of the wrinkle-enhanced image according to the second exemplary embodiment of the present disclosure.

FIG. 6 is a diagram illustrating an example of the wrinkle-enhanced image of a section around eyes. FIG. 7 is a diagram illustrating an example of the wrinkle-enhanced image of a section around a mouth.

As illustrated in FIG. 6 and FIG. 7, wrinkle-enhanced images 410 and 420 are generated through superimposition of images 411 and 412 of the determined wrinkle area on photographed images 421 and 422, respectively.

The aforementioned operation allows wrinkle detection apparatus 100 to estimate the image areas that are the positions of the plurality of areas in the photographed image, each of the image areas having a different gloss level of skin, to determine appropriate parameter values for each of the estimated image areas, to perform wrinkle detection, and to present a detection result to a user.

Effect of the Present Exemplary Embodiment

As described above, wrinkle detection apparatus 100 according to the present exemplary embodiment estimates the image areas that are the positions of the areas in the photographed image, each of the plurality of areas having a different gloss level of skin, and determines the parameter values suitable for the gloss level of skin for each of the estimated image areas. Wrinkle detection apparatus 100 according to the present exemplary embodiment then detects the wrinkle area from the photographed image by using the parameter values determined for each image area.

As described above, a state of the wrinkle area shown on the photographed image can differ depending on the gloss level of skin. In addition, the gloss level can differ between skin portions. Wrinkle detection apparatus 100 according to the present exemplary embodiment adaptively switches the parameter values to be used for wrinkle detection to suit the state of the wrinkle area shown on the photographed image, and thus can perform wrinkle detection with more uniform accuracy, even when the gloss level shows variations. That is, it is possible to detect the wrinkle by criteria similar to criteria for a person to recognize presence of the wrinkle of skin with naked eyes.

Wrinkle detection apparatus 100 according to the present exemplary embodiment can perform wrinkle detection with uniform accuracy even when the gloss level shows variations, and thus can perform wrinkle detection with uniform accuracy even from an image photographed by firing a flash.

<Other Determination Methods of the Parameter Values>

The parameter values determined for each image area are not limited to the above example. For example, wrinkle detection unit 220 can perform wrinkle detection by multiplying the gradient value calculated by the Gabor filter processing by a gain value, and by comparing the obtained value with a threshold. In this case, parameter determination unit 222 may determine the gain value for each image area, instead of the threshold.

That is, parameter determination unit 222 determines the gain value lower than the gain value that is set in the overall area, for the image area for which a high threshold is to be set (the area having a high gloss level). Parameter determination unit 222 determines the gain value higher than the gain value that is set in the areas below both eyes, for the image area for which a low threshold is to be set (the area having a low gloss level).

Wrinkle detection processing unit 223 can use the gain value of each portion of the photographed image as a gain mask for distribution of the gradient value.

Most of the edge detection processing, such as the Gabor filter processing, performs calculation by also using the pixel value of a surrounding area of a pixel that is a target of calculation of the gradient value. Accordingly, overhead of arithmetic processing occurs in a border portion of the plurality of image areas because of an overlap of both areas. Use of the gain mask having the gain value determined for each image area allows edge enhancement processing to be executed at a time, and allows avoidance of the overhead.

When the gain mask is used, parameter determination unit 222 or wrinkle detection processing unit 223 may change a mask value gradually in the border portion between the image areas.

Wrinkle detection processing unit 223 may use the gain mask after applying known expansion processing and contracting processing to an edge detection image obtained by edge detection processing. In this case, parameter determination unit 222 determines so that the level of the expansion processing and the level of the contracting processing become stronger in the image area corresponding to the area having a higher gloss.

The one or more parameter values that parameter determination unit 222 determines for each image area may be part of the above-described plurality of types of parameter values, and may further include other parameter values used for the Gabor function.

Other Variations of the Present Exemplary Embodiment

The method for calculation of the gradient value of each portion is not limited to the above example. Wrinkle detection processing unit 223 may calculate the gradient value of each portion by known edge detection processing using the Laplacian filter, the Prewitt filter, the Sobel filter, for example.

The method for estimation of the plurality of image areas corresponding to the plurality of areas, each of the areas having a different gloss level of skin is not limited to the above example. For example, area estimation unit 210 may estimate distribution (hereinafter referred to as "gloss distribution") of the gloss level in the photographed image. Parameter determination unit 222 may then determine the one or more parameter values of each image area based on the estimated gloss distribution.

For example, area estimation unit 210 estimates the gloss distribution based on the positions of the facial components, and divides the photographed image into the plurality of image areas in accordance with the gloss level. Area estimation unit 210 then determines the parameter values for each image area with reference to the previously stored table that associates the gloss level with the parameter values. When wrinkle detection apparatus 100 includes a three-dimensional shape obtaining unit for obtaining a three-dimensional shape of skin from the photographed image, area estimation unit 210 may estimate the gloss distribution based on the three-dimensional shape obtained by the three-dimensional shape obtaining unit. Area estimation unit 210 may previously store a three-dimensional shape model of a typical face, and may estimate the gloss distribution based on such a model.

For example, area estimation unit 210 estimates that the gloss level is higher in a portion of a protruding shape, such as a tip of a nose or a cheek, than in other portions.

In addition, when wrinkle detection apparatus 100 includes a light source information obtaining unit for obtaining light source information that indicates a position of a light source with respect to skin, area estimation unit 210 may estimate the gloss distribution based on the light source information obtained by the light source information obtaining unit.

For example, when the light source is located above the face, area estimation unit 210 estimates that the gloss level is higher in a portion in which a skin surface faces upward, such as a forehead or an upper cheek, than in other portions.

When wrinkle detection apparatus 100 includes a gloss detection unit for detecting the gloss distribution, area estimation unit 210 may employ the detected gloss distribution as an estimation result of the gloss distribution. For example, in a state where skin is irradiated with polarized light, the gloss detection unit detects the gloss distribution based on a plurality of images obtained by switching angles between the polarized light and a polarizing filter and by photographing the skin with a camera equipped with the polarizing filter.

Although the exemplary embodiments described above assume that the detection target is the wrinkle of skin, the detection target may be another state that has a shape of a linear groove, such as a scratch on a wall, a crack on a surface of a metallic material, and a wrinkle of cloth.

SUMMARY OF THE PRESENT DISCLOSURE

A wrinkle detection apparatus according to the present disclosure includes: an image obtaining unit that obtains an image including skin; an area estimation unit that estimates a plurality of image areas, each of the plurality of image areas having a different gloss level of the skin; a parameter determination unit that determines one or more parameter values for each of the plurality of estimated image areas, the one or more parameter values being used to detect a wrinkle area; and a wrinkle detection processing unit that detects the wrinkle area in the image by using the determined one or more parameter values for each of the plurality of image areas.

In the wrinkle detection apparatus, the plurality of areas constitutes a face. The wrinkle detection apparatus includes: a facial component obtaining unit that obtains a position of a facial component from the image; and a table storage unit that stores a parameter value table that describes the correspondence relation between each of the plurality of areas and the one or more parameter values. The area estimation unit may estimate the image area based on the position of the facial component obtained by the facial component obtaining unit. The parameter determination unit may determine the one or more parameter values with reference to the parameter value table.

In the wrinkle detection apparatus, the area estimation unit may estimate gloss distribution that is distribution of the gloss level in the image, and the parameter determination unit may determine the one or more parameter values based on the gloss distribution estimated by the area estimation unit.

The wrinkle detection apparatus further includes a facial component obtaining unit that obtains a position of a facial component from the image. The area estimation unit may estimate the gloss distribution based on the position of the facial component obtained by the facial component obtaining unit.

The wrinkle detection apparatus further includes a three-dimensional shape obtaining unit that obtains a three-dimensional shape of the skin from the image. The area estimation unit may estimate the gloss distribution based on the three-dimensional shape obtained by the three-dimensional shape obtaining unit.

The wrinkle detection apparatus further includes a light source information obtaining unit that obtains light source information that indicates a position of a light source with respect to the skin. The area estimation unit may estimate the gloss distribution based on the light source information obtained by the light source information obtaining unit.

In the wrinkle detection apparatus, the wrinkle detection processing unit may detect the wrinkle area in the image by calculating a gradient value that indicates a degree of change in a pixel value in the image, and by comparing the gradient value with a threshold. The one or more parameter values may include the threshold.

In the wrinkle detection apparatus, the wrinkle detection processing unit may detect the wrinkle area in the image by calculating a gradient value that indicates a degree of change in a pixel value in the image, and by comparing, with a threshold, a value obtained by multiplying the gradient value by a gain value. The one or more parameter values may include the gain value.

In the wrinkle detection apparatus, the wrinkle detection processing unit may detect the wrinkle area in the image by calculating a gradient value that indicates a degree of change in a pixel value in the image by using a Gabor filter, and by comparing the gradient value with a threshold. The one or more parameter values may include at least one of an angle and wavelength that are used for the Gabor filter.

A wrinkle detection method according to the present disclosure includes: obtaining an image including skin; estimating a plurality of image areas, each of the plurality of image areas having a different gloss level of the skin; determining one or more parameter values for each of the plurality of estimated image areas, the one or more parameter values being used to detect a wrinkle area; and detecting the wrinkle area in the image by using the determined one or more parameter values for each of the plurality of image areas.

The present disclosure is useful as the wrinkle detection apparatus and the wrinkle detection method that enable wrinkle detection with more uniform accuracy even when the gloss level shows variations.

What is claimed is:

1. A wrinkle detection apparatus comprising:
a memory that stores instructions; and
a processor that, when executing the instructions stored in the memory, performs operations comprising:
obtaining an image including skin;
estimating a plurality of image areas in the image, each of the plurality of image areas belonging to either a first area or a second area other than the first area, the first area extending from a lower eyelid of a left eye to above a left cheek and extending from a lower eyelid of a right eye to above a right cheek;
determining first parameter values for each of the estimated image areas belonging to the first area and second parameter values for each of the estimated image areas belonging to the second area,
the first parameter values including a first threshold value, a first filter angle for a Gabor filter, and a first filter wavelength for the Gabor filter,
the second parameter values including a second threshold value, a second filter angle for the Gabor filter, and a second filter wavelength for the Gabor filter, and
the first threshold value being smaller than the second threshold value, the first filter angle having a narrower angle range than the second filter angle, and the first filter wavelength being shorter than the second filter wavelength; and
detecting a wrinkle area in the image by calculating first gradient values in the first area by using the Gabor filter adopting the first filter angle and the first filter wavelength, calculating second gradient values in the second area by using the Gabor filter adopting the second filter angle and the second filter wavelength, comparing each of the first gradient values with the first threshold value, and comparing each of the second gradient values with the second threshold value.

2. A computer-implemented wrinkle detection method comprising:
obtaining, by a processor, an image including skin;
estimating, by a processor, a plurality of image areas in the image, each of the plurality of image areas belonging to either a first area or a second area other than the first area, the first area extending from a lower eyelid of a left eye to above a left cheek and extending from a lower eyelid of a right eye to above a right cheek;
determining, by a processor, first parameter values for each of the estimated image areas belonging to the first area and second parameter values for each of the estimated image areas belonging to the second area,
the first parameter values including a first threshold value, a first filter angle for a Gabor filter, and a first filter wavelength for the Gabor filter,
the second parameter values including a second threshold value, a second filter angle for the Gabor filter, and a second filter wavelength for the Gabor filter, and
the first threshold value being smaller than the second threshold value, the first filter angle having a narrower angle range than the second filter angle, and the first filter wavelength being shorter than the second filter wavelength; and
detecting, by a processor, the wrinkle area in the image by calculating first gradient values in the first area by using the Gabor filter adopting the first filter angle and the first filter wavelength, calculating second gradient values in the second area by using the Gabor filter adopting the second filter angle and the second filter wavelength, comparing each of the first gradient values with the first threshold value, and comparing each of the second gradient values with the second threshold value.

3. The wrinkle detection apparatus according to claim 1, wherein
each of the first gradient values and the second gradient values indicates a degree of change in a pixel value in the image,
in the first gradient values, a gradient value for an edge area is bigger than a gradient value for a non-edge area, and
in the second gradient values, a gradient value for an edge area is bigger than a gradient value for a non-edge area.

4. The wrinkle detection method according to claim 2, wherein
each of the first gradient values and the second gradient values indicates a degree of change in a pixel value in the image,
in the first gradient values, a gradient value for an edge area is bigger than a gradient value for a non-edge area, and
in the second gradient values, a gradient value for an edge area is bigger than a gradient value for a non-edge area.

* * * * *